United States Patent
Teller et al.

(10) Patent No.: US 9,900,080 B2
(45) Date of Patent: *Feb. 20, 2018

(54) LOCATION-AWARE PROFILES IN AN AERIAL NETWORK

(71) Applicant: X Development LLC, Mountain View, CA (US)

(72) Inventors: Eric Teller, San Francisco, CA (US); Richard Wayne DeVaul, Mountain View, CA (US); Clifford L. Biffle, Berkeley, CA (US); Josh Weaver, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,452

(22) Filed: Feb. 6, 2017

(65) Prior Publication Data

US 2017/0149492 A1    May 25, 2017

Related U.S. Application Data

(63) Continuation of application No. 15/013,850, filed on Feb. 2, 2016, now Pat. No. 9,584,214, which is a
(Continued)

(51) Int. Cl.
*H04B 7/185* (2006.01)
*H04W 4/02* (2018.01)
(Continued)

(52) U.S. Cl.
CPC ......... *H04B 7/18502* (2013.01); *H04L 41/12* (2013.01); *H04L 67/303* (2013.01);
(Continued)

(58) Field of Classification Search
CPC . H04B 7/18502; H04L 67/288; H04L 67/303; H04L 67/18; H04L 67/306;
(Continued)

(56) References Cited

U.S. PATENT DOCUMENTS 2,871,597 A    2/1959  Yost
3,070,335 A   12/1962  Bohl et al.
(Continued)

FOREIGN PATENT DOCUMENTS

CN    1925442 A    3/2007
DE    4023112      1/1992
(Continued)

OTHER PUBLICATIONS

International Preliminary Report on Patentability for corresponding PCT application No. PCT/US2013/069892, dated Jun. 9, 2015.
(Continued)

*Primary Examiner* — Dominic Rego
(74) *Attorney, Agent, or Firm* — McDonnell Boehnen Hulbert & Berghoff LLP

(57) ABSTRACT

Disclosed embodiments may help an aerial vehicle network to provide substantially continuous service in a given geographic area. An example method may be carried out at an aerial vehicle that is at a location associated with the first geographic area in an aerial network that includes a plurality of geographic areas. The balloon may determine that it should update its vehicle-state in accordance with a vehicle-state profile for the first geographic area. Then, in response, the balloon may determine the vehicle-state profile for the first geographic area, which may include one or more state parameters for balloons operating in the first geographic area. The balloon may then operate according to the vehicle-state profile for the first geographic area.

20 Claims, 7 Drawing Sheets

Related U.S. Application Data continuation of application No. 13/485,514, filed on May 31, 2012, now Pat. No. 9,281,896, which is a continuation of application No. 13/366,100, filed on Feb. 3, 2012, now Pat. No. 8,825,847.

(51) Int. Cl.
  *H04W 52/18* (2009.01)
  *H04W 40/38* (2009.01)
  *H04L 12/24* (2006.01)
  *H04L 29/08* (2006.01)

(52) U.S. Cl.
  CPC ........... *H04W 4/021* (2013.01); *H04W 4/026* (2013.01); *H04W 40/38* (2013.01); *H04W 52/18* (2013.01)

(58) Field of Classification Search
  CPC ..... H04W 4/021; H04W 4/023; H04W 4/025; H04W 4/026
  USPC ...... 455/431, 13.1, 11.1, 98; 701/3; 709/224
  See application file for complete search history.

(56) References Cited

U.S. PATENT DOCUMENTS

| | | | |
|---|---|---|---|
| 4,640,474 | A | 2/1987 | Manseth |
| 5,080,302 | A | 1/1992 | Hoke |
| 5,519,761 | A | 5/1996 | Gilhousen |
| 5,590,395 | A | 12/1996 | Diekelman |
| 5,987,379 | A | 11/1999 | Smith |
| 6,167,263 | A | 12/2000 | Campbell |
| 6,324,398 | B1 | 11/2001 | Lanzerotti et al. |
| 6,744,382 | B1 | 6/2004 | Lapis |
| 7,059,570 | B2 | 6/2006 | Strong |
| 7,275,496 | B2 | 10/2007 | French |
| 7,356,390 | B2 | 4/2008 | Knoblach |
| 8,001,902 | B2 | 8/2011 | Bass |
| 8,006,936 | B1 | 8/2011 | Farr, III |
| 8,068,038 | B2 | 11/2011 | Engels |
| 8,116,763 | B1 | 2/2012 | Olsen |
| 8,290,515 | B2 | 10/2012 | Staton et al. |
| 8,566,900 | B1 | 10/2013 | Bharali et al. |
| 8,825,847 | B1 * | 9/2014 | Teller ............... H04W 4/04 455/431 |
| 9,047,769 | B2 | 6/2015 | Lafon |
| 2002/0072361 | A1 | 6/2002 | Knoblach |
| 2002/0167702 | A1 | 11/2002 | Badesha |
| 2003/0055540 | A1 | 3/2003 | Hansen |
| 2003/0217150 | A1 | 11/2003 | Roese |
| 2003/0236070 | A1 | 12/2003 | Seligsohn |
| 2006/0002326 | A1 | 1/2006 | Vesuna |
| 2006/0003698 | A1 | 1/2006 | Seligsohn et al. |
| 2006/0030345 | A1 | 2/2006 | Jain |
| 2006/0031830 | A1 | 2/2006 | Chu et al. |
| 2006/0063529 | A1 | 3/2006 | Seligsohn |
| 2006/0085106 | A1 * | 4/2006 | Gaudiano ............... G01C 11/00 701/23 |
| 2006/0227744 | A1 | 10/2006 | Metke |
| 2007/0021117 | A1 | 1/2007 | McKenna et al. |
| 2007/0112705 | A1 | 5/2007 | Mardirossian |
| 2008/0139114 | A1 | 6/2008 | Ranganathan |
| 2008/0284588 | A1 | 11/2008 | Kim |
| 2008/0299990 | A1 | 12/2008 | Knoblach |
| 2009/0085761 | A1 | 4/2009 | Buer |
| 2009/0098850 | A1 | 4/2009 | Deaton et al. |
| 2009/0224094 | A1 | 9/2009 | Lachenmeier |
| 2010/0121571 | A1 | 5/2010 | Cabral |
| 2010/0248742 | A1 | 9/2010 | Song et al. |
| 2011/0046817 | A1 * | 2/2011 | Hamke .................. G05D 1/101 701/3 |
| 2011/0134781 | A1 | 6/2011 | Malnati |
| 2011/0148634 | A1 | 6/2011 | Putz |
| 2011/0177826 | A1 | 7/2011 | Huang |
| 2011/0222047 | A1 | 9/2011 | Guetta |
| 2012/0044710 | A1 * | 2/2012 | Jones ..................... B64C 39/024 362/470 |
| 2012/0109614 | A1 * | 5/2012 | Lindores ............... A01B 79/005 703/11 |
| 2012/0198069 | A1 | 8/2012 | Black |
| 2013/0175387 | A1 | 7/2013 | DeVaul et al. |
| 2013/0205310 | A1 | 8/2013 | Stahl et al. |
| 2013/0238784 | A1 | 9/2013 | Teller et al. |
| 2014/0014770 | A1 | 1/2014 | Teller |
| 2014/0155093 | A1 | 6/2014 | Teller |
| 2014/0335895 | A1 | 11/2014 | Teller et al. |

FOREIGN PATENT DOCUMENTS

| | | |
|---|---|---|
| EP | 2856664 A1 | 4/2015 |
| JP | 2000-177695 | 6/2000 |
| WO | 01/76300 | 10/2001 |
| WO | 05/060509 | 7/2005 |
| WO | 10/010452 A1 | 1/2010 |
| WO | 2013181264 A1 | 12/2013 |

OTHER PUBLICATIONS

International Search Report for corresponding PCT application No. PCT/US2013/069892, dated Mar. 26, 2014.
International Search Report and Written Opinion for PCT application No. PCT/US2013/040324, dated Sep. 23, 2013.
European Patent Office, Extended European Search Report for EP13816293, dated Jul. 17, 2015, 7 pages.
International Search Report and Written Opinion for PCT application No. PCT/US2013/069866, dated Feb. 28, 2014.
European communication for application No. 13862768.2 dated Jul. 20, 2016.

* cited by examiner

LOCATION-AWARE PROFILES IN AN AERIAL NETWORK

CROSS-REFERENCE TO RELATED APPLICATIONS

The present application is a continuation of co-owned U.S. patent application Ser. No. 15/013,850, filed Feb. 2, 2016, now pending, which is a continuation of U.S. patent application Ser. No. 13/485,514, filed on May 31, 2012, which claims priority to U.S. patent application Ser. No. 13/366,100, filed Feb. 3, 2012, all of which are incorporated by reference herein in their entirety and for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a computer-implemented method involves: (a) at a balloon that is at a location associated with the first geographic area in a balloon network, wherein the balloon network comprises a plurality of geographic areas, determining that a balloon-state of the balloon should be updated in accordance with a balloon-state profile for the first geographic area, and (b) in response to determining that the balloon-state should be updated: (i) determining the balloon-state profile for the first geographic area, wherein the balloon-state profile comprises one or more state parameters for balloons operating in the first geographic area; and (ii) causing the balloon to operate according to the balloon-state profile for the first geographic area.

In another aspect, a non-transitory computer-readable medium may have program instructions stored thereon that are executable by at least one processor. The program instructions include: (a) instructions for determining that a balloon should be updated with balloon-state information for a first geographic area in a balloon network, wherein the balloon is at a location associated with the first geographic area, and wherein the balloon network comprises a plurality of geographic areas; and (b) instructions for, in response to determining that the balloon-state information should be updated: (i) determining a balloon-state profile for the first geographic area, wherein the balloon-state profile comprises one or more state parameters for balloons operating in the second geographic area; and (ii) causing the balloon to operate according to the second balloon-state profile.

In yet another aspect, a computer-implemented method involves: (a) at a balloon that is operable in a balloon network that comprises a plurality of geographic areas, determining that the balloon is at a location associated with the first geographic area in the balloon network; (b) determining a balloon-state profile for the first geographic area, wherein the balloon-state profile comprises one or more state parameters for balloons operating in the first geographic area; and (c) transmitting a balloon-state signal via a communication channel, wherein the communication channel is accessible to one or more other balloons that are operable in the balloon network, wherein the balloon-state signal indicates at least a portion of the balloon-state profile for the first geographic area.

In a further aspect, a non-transitory computer-readable medium may have program instructions stored thereon that are executable by at least one processor. The program instructions include: (a) instructions for determining that a balloon is at a location associated with the first geographic area in a balloon network, wherein the balloon network comprises a plurality of geographic areas; (b) instructions for determining a balloon-state profile for the first geographic area, wherein the balloon-state profile comprises one or more state parameters for balloons operating in the first geographic area; and (c) instructions for transmitting a balloon-state signal via a communication channel, wherein the communication channel is accessible to one or more other balloons that are operable in the balloon network, wherein the balloon-state signal indicates at least a portion of the balloon-state profile for the first geographic area.

These as well as other aspects, advantages, and alternatives, will become apparent to those of ordinary skill in the art by reading the following detailed description, with reference where appropriate to the accompanying drawings.

DETAILED DESCRIPTION

Figure 1:
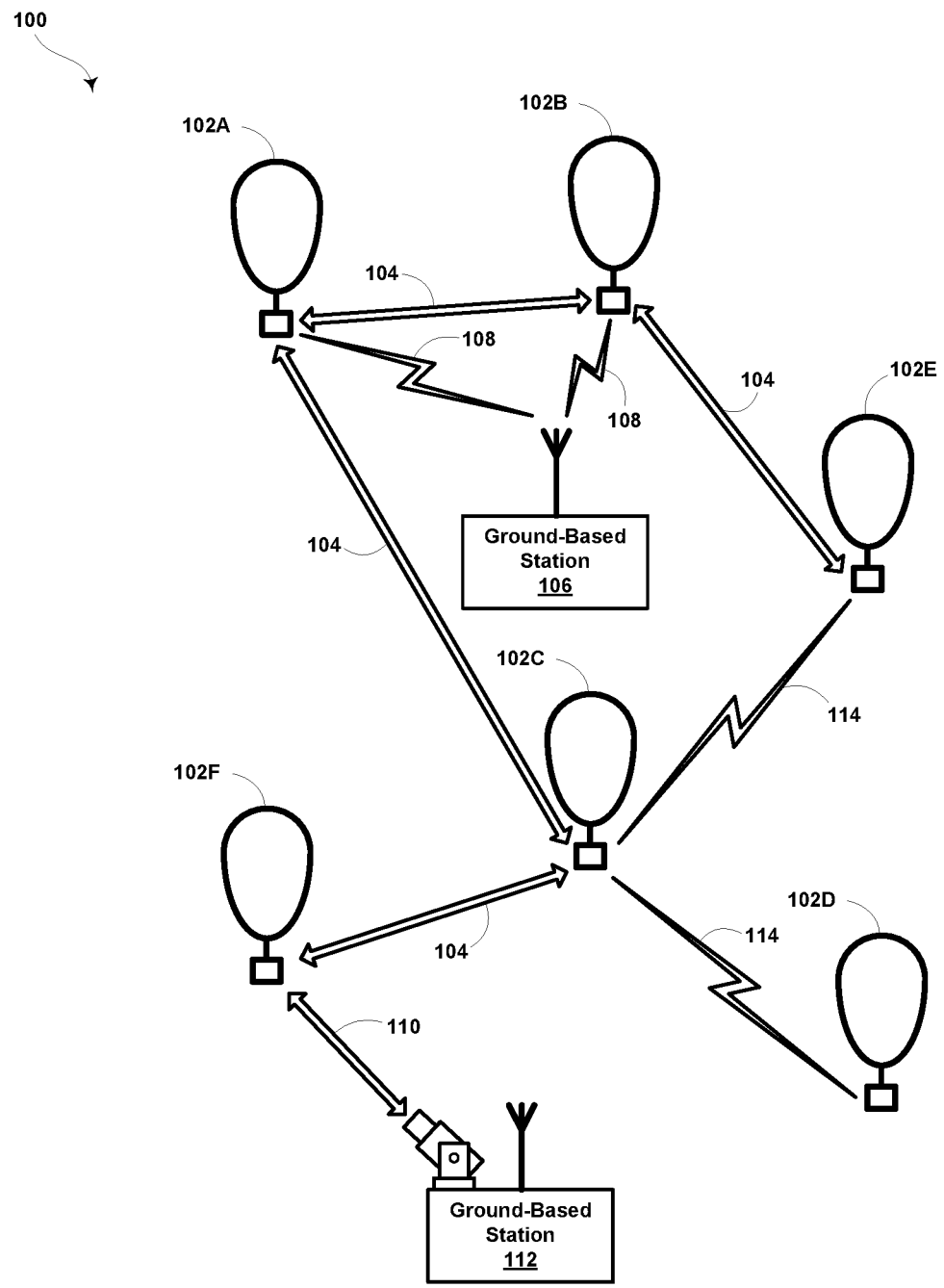
FIG. 1 is a simplified block diagram illustrating a balloon network, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

Exemplary embodiments may be implemented in association with a data network that includes a plurality of balloons; for example, a mesh network formed by high-altitude balloons deployed in the stratosphere. Since winds in the stratosphere may affect the locations of the balloons in a differential manner, each balloon in an exemplary network may be configured to change its horizontal position by adjusting its vertical position (i.e., altitude). For example, by adjusting its altitude, a balloon may be able find winds that will carry it horizontally (e.g., latitudinally and/or longitudinally) to a desired horizontal location.

In an exemplary balloon network, balloons may move latitudinally and/or longitudinally relative to one another so as to form a desired topology. However, keeping an individual balloon at a specific location may be difficult due to winds, and possibly for other reasons as well. Accordingly, the desired topology may define a relative framework and/or rules for positioning of balloons relative to one another, such that balloons can move with respect to the ground, while maintaining the desired topology. Thus, at a given location on earth, the particular balloon or balloons that provide service may change over time.

In the context of a geographic location's serving balloon or balloons changing over time, it may be desirable to provide services and features that, from the perspective of the end user, appear to be substantially the same as in an access network where access points remain stationary. Accordingly, in an exemplary embodiment, balloons may implement location-aware balloon profiling, such that balloon state is tied, at least in part, to a particular geographic area, rather than being tied to a particular balloon or balloons. Thus, while balloons may move about geographically, location-specific balloon-state profiles may help to provide continuity in services, features, and network functionality in a given geographic area, such that handoffs as balloons move into or out of the geographic area are substantially transparent to the end user.

In particular, location-specific "ghost" balloon-state profiles may be defined, which each provide balloon-state information that is specific to a particular geographic area. As such, any balloon that moves into a particular geographic area may configure itself to operate according to the area's balloon-state profile for as long as it remains in the area.

Further, location-specific balloon-profiles may be shared between balloons. For instance, in some embodiments, balloon-state information for a particular geographic area may be handed off between balloons. As a specific example, a balloon that enters or is about to enter a geographic area may acquire the balloon-state profile for the geographic area from a balloon or balloons already located in the geographic area (or possibly a balloon or balloons that have just left the area). Further, in some cases, a balloon may acquire some or all of the balloon-state profile for a geographic area from a ground-based station.

A location-specific balloon-state profile may specify various types of balloon-state information for balloons that operate in its corresponding geographic area. In some cases, balloon-state information for a given geographic area may include configuration information and/or operating parameters for balloons that operate in the area. For example, a location-specific balloon-state profile may specify a communication protocol or protocols to be used by balloons operating in a particular geographic area. As another example, a location-specific balloon-state profile could specify a power-usage profile to be used by balloons operating in a particular geographic area (e.g., whether the balloon can should use more or less power than typical while located in the area). Other examples are possible as well.

Further, balloon-state information for a geographic area could specify operating parameters such that balloons that are located in the geographic area will operate in accordance with legal requirements established by the governing body of the country in which the geographic area is located. Accordingly, balloons could adapt their operation to varying legal requirements of differently-governed areas as, e.g., they move from one country, state, or city to another (and/or to an area where international law applies).

Further, balloon-state information for a given geographic area may include or indicate certain data that should be cached in a certain region. For example, a location-specific balloon-state profile for a given geographic area might specify that a balloon should cache common web pages in a certain language, which is spoken in the given geographic area. Further, a balloon could acquire the specified data for its cache in a typical manner (e.g., by accessing a URL for the webpage directly and then storing the webpage), or by requesting and/or receiving the specified data from nearby balloons.

It should be understood that the above examples of balloon-state information, which may be provided by a balloon-state profile, are provided for illustrative purposes, and should not be construed as limiting. As such, a balloon-state profile may additionally or alternatively include other types of balloon-state information, without departing from the scope of the invention.

Note that the geographic areas, to which balloon-state profiles are assigned, may be defined independently from the coverage reach of the balloons. In other words, the geographic areas may be defined in a manner that is not dependent on the individual coverage areas served by balloons in the balloon network. For instance, in the above example where balloon-state profiles are such that balloons located in a geographic area will operate in accordance with legal requirements in whatever geographic area they move into, geographic areas may be defined based on borders established by governing bodies (e.g., borders between countries, states, cities, etc.).

Further, in some embodiments, geographic areas may be defined around certain operating requirements for certain areas. For instance, geographic areas may be defined for areas having certain bandwidth requirements (e.g., where demand for bandwidth is higher or lower than is typical in the balloon network). For example, a geographic area could be defined around a stadium or an arena where sporting events and concerts take place, so as to help satisfy higher demand for bandwidth that is typically associated with such events. Other examples are possible.

Yet further, geographic areas may be defined dynamically based on changing operating requirements in different areas served by a balloon network. For example, if a bandwidth demand in area is observed to increase significantly, then the geographic area in which the demand increase occurred, and a corresponding balloon-state profile for the area, may be dynamically defined.

As a specific example, a stadium that is located in a suburban area may be located within a larger geographic area, which includes a number of suburbs. However, when there is an event at the stadium, the balloon network may detect a spike in bandwidth demand in the localized area in and around the stadium (e.g., an increase over historical norms in the area that lasts at least an hour), and dynamically define a balloon-state profile for the smaller geographic area in and around the stadium (while removing this smaller geographic area from the larger geographic area for the suburbs). Later, when the event ends and the demand decreases, the balloon network may detect the decreased demand, and re-define the geographic areas such that the stadium is again part of the larger geographic area for the suburbs. Other specific examples are also possible.

As another example, geographic areas may be defined based on design considerations. For instance, geographic areas may be defined for different areas according to differing power requirements of end users in the areas, differing interference concerns for RF and/or optical signals in the areas, and/or differing types of service desired by end users in the areas, among other possibilities.

In a further aspect, balloons could also maintain location-aware caches of user-data, which each balloon updates according to the respective geographic area in which it is located. As such, balloons that update their state according to location-specific balloon-state profiles may also update their respective location-aware caches as they move in and out of the defined geographic areas, such that whichever balloon or balloons are in a given geographic area can provide the same or a similar cache of user-data, while located in the given geographic area. Thus, while balloons might move between geographic areas, users in a given geographic area may be provided with caching functionality that replicates, or at least comes close to replicating, the caching functions of a fixed access point.

Further, location-specific balloon-profiles may be assigned to fixed geographic areas, which are defined by specific geographic coordinates, such as GPS coordinates, for example. However, a location-specific balloon-profile could also be assigned to a moving geographic area. A moving geographic area may be defined by, e.g., a moving object or person. For example, a moving geographic area could be defined around a vehicle capable of changing its location (e.g., cars, trains, cruise ships, etc.). As another example, a moving geographic area could be defined around a certain person or group of people, such that there is continuity in the service provided to the person or group as they move about geographically.

II. Exemplary Balloon Networks

An exemplary embodiment may be implemented in association with various types of balloon networks. For instance, in an exemplary balloon network, the balloons may communicate with one another using free-space optical communications. As an example, the balloons may be configured for optical communications using ultra-bright LEDs (which are also referred to as "high-power" or "high-output" LEDs). In some instances, lasers could be used instead of or in addition to LEDs, although regulations for laser communications may restrict laser usage. In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network may additionally be configured to communicate with ground-based station(s) using RF communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons (i.e., two or more types of balloons that function in substantially different ways). For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an exemplary embodiment, can be configured to communicate via optical links with ground-based stations and/or satellites.

In an exemplary configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an exemplary embodiment. As shown, balloon network 100 includes balloons 102A to 102F, which are configured to communicate with one another via free-space optical links 104. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has relatively low wind-speeds (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of exemplary balloons are discussed in greater detail below, with reference to FIG. 3.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based stations 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may scenarios where RF links 108 do not provide a desired link capacity for balloon-ground communications. For instance, increased capacity may be desirable to provide backhaul links from a ground-based gateway, and in other scenarios as well. Accordingly, an exemplary network may also include downlink balloons, which provide a high-capacity air-ground link.

For example, in balloon network 100, balloon 102F is configured as a downlink balloon. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 108.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 108, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100. Ground-based stations 106 may have other configurations and/or serve other purposes without departing from the scope of the invention.

In a further aspect, some or all balloons 102A to 102F could be configured to establish a communication link with space-based satellites in addition to, or as an alternative to, a ground-based communication link. In some embodiments, a balloon may communicate with a satellite via an optical link. However, other types of satellite communications are also possible.

Further, some ground-based stations, such as ground-based station 108, may be configured as gateways between balloon network 100 and one or more other networks. Such a ground-based station 108 may thus serve as an interface between the balloon network and the Internet, a cellular service provider's network, and/or other types of networks. Variations on this configuration and other configurations of a ground-based station 108 are also possible.

A. Mesh-Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO)

switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

B. Station-Keeping Functionality

In an exemplary embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an exemplary balloon network may be adaptable. In particular, station-keeping functionality of exemplary balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
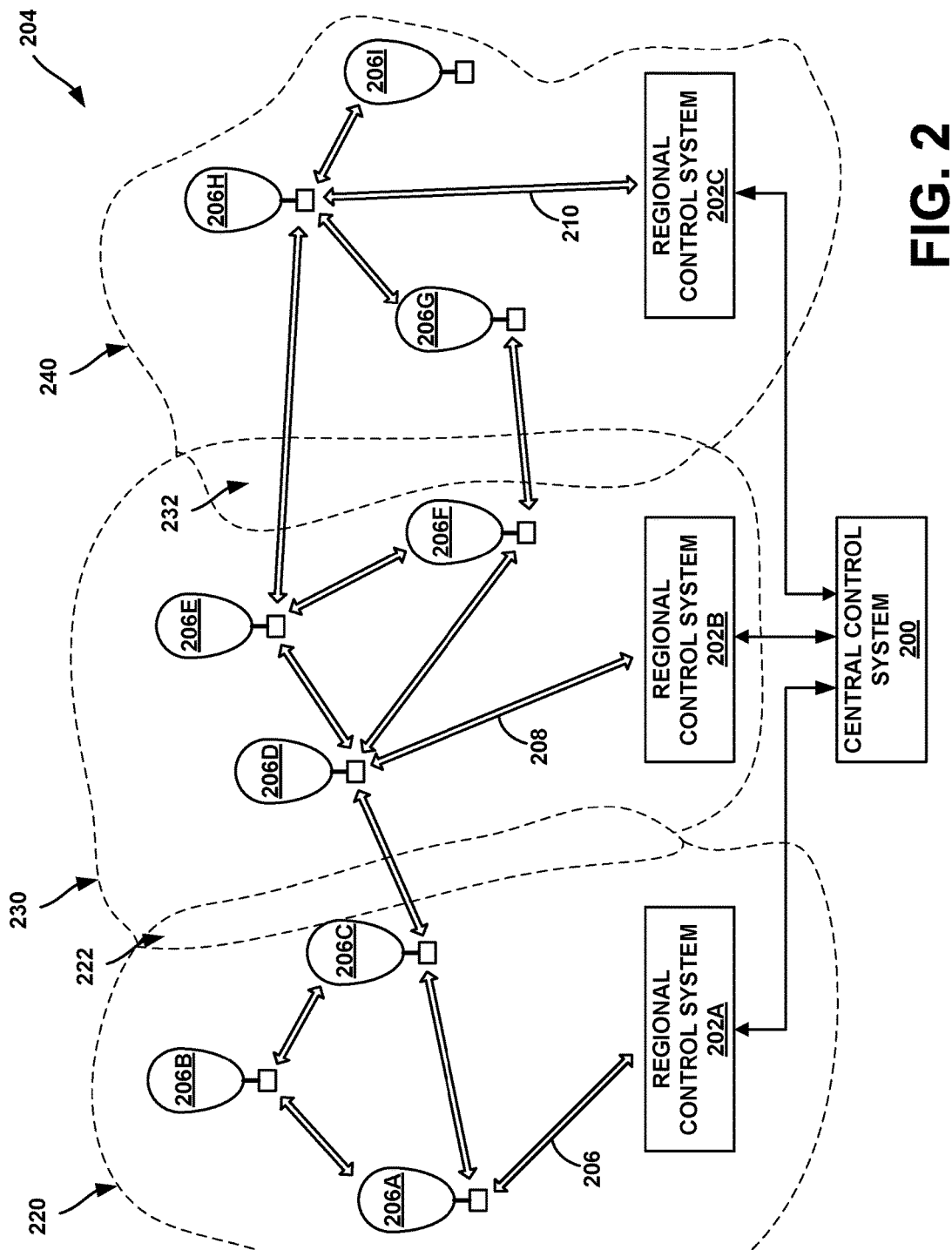
FIG. 2 is a block diagram illustrating a balloon-network control system, according to an exemplary embodiment.

In some embodiments, mesh networking and/or station-keeping functions may be centralized. For example, FIG. 2 is a block diagram illustrating a balloon-network control system, according to an exemplary embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 204A, 204D, and 204H are configured as downlink balloons. As such, regional control systems 202A to 202C may respectively communicate with balloons 204A, 204D, and 204H via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B-E and 206G-H. However, it should be understood that it in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202B may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

D. Defined Geographic Areas within a Balloon Network

In a further aspect, which is illustrated by FIG. 2, a balloon network may serve a coverage area that is subdivided into a number of defined geographic areas 220 to 240. Further, while FIG. 2 illustrates three defined geographic areas 220 to 240, more or less geographic areas may be defined, without departing from the scope of the invention. Yet further, while geographic areas 220 to 240 are shown as distinct coverage areas that do not overlap, it is possible that two or more geographic areas may be defined so as to overlap (at least partially).

In an exemplary embodiment, each balloon 206A to 206I may operate according to the balloon-state profile of the respective geographic area 220 to 240 in which the balloon is located at a given point in time. For example, in the illustrated state of balloon network 204, balloons 206A to 206C may each set their respective balloon state and operate according to the balloon-state profile for geographic area 220, balloons 206D to 206F may each set their respective balloon state and operate according to the balloon-state profile for geographic area 230, and balloons 206G to 206I may each set their respective balloon state and operate according to the balloon-state profile for geographic area 240.

Further, when a given balloon 206A to 206I moves from one geographic area to another, the balloon may update its balloon-state accordingly. For instance, if balloon 206C were to move from its location shown in FIG. 2, in geographic area 220, to geographic area 230, balloon 206C may update its balloon-state according to the balloon-state profile for geographic area 230. In some cases, this may involve balloon 306C updating certain settings and/or certain operational parameters, which were previously set according to the balloon-state profile for geographic area 220, as indicated by the balloon-profile for geographic area 230.

Further, a balloon 206A to 206I could maintain and update a location-aware cache and/or other data according to the geographic area 220 to 240 in which it is located at a given point in time (or a geographic area that the balloon anticipates being located in). For example, the balloon-state profile for a given geographic area 220 to 240 may indicate that a balloon should acquire, store, and/or provide certain data while operating in the respective geographic area. As a specific example, in the illustrated state of balloon network 204, balloons 206A to 206C may each store user-data that is associated geographic area 220 and/or data this is identified by the balloon-state profile for geographic area 220, balloons 206D to 206F may each store user-data that is associated geographic area 230 and/or data this is identified by the balloon-state profile for geographic area 230, and balloons 206G to 206I may each store user-data that is associated geographic area 240 and/or data this is identified by the balloon-state profile for geographic area 240. Other examples are also possible.

In some cases, such as the example illustrated in FIG. 2, the coverage area of balloon network may include defined border areas, which separate the defined geographic areas. In the illustrated embodiment, geographic areas 220 and 230 are separated by border area 222, while geographic areas 230 and 240 are separated by border area 232. Note that a border area may also be treated as an area where two or more coverage areas overlap, rather than a distinct area that separates two adjacent coverage areas. For instance, border area 222 may be created by defining geographic areas 220 and 230 such that these geographic areas overlap in border area 222.

In some embodiments, a balloon 206A to 206I may update (or begin to update) its balloon-state when it moves into a border area 222 or 232. In such an embodiment, a border area in a given geographic area may be associated with the adjacent geographic areas that it separates. Accordingly, when a balloon moves into a border area, it may update or prepare to update its balloon-state according to the balloon-state profile for the geographic area or geographic areas associated with the border area, which the balloon expects or is likely to move into. To do so, the balloon may update or prepare to update operational parameters according to the balloon-state profile for the geographic area into which it expects to move, and/or may store data identified by the balloon-state profile for the geographic area into which it expects to move.

For example, a balloon 206C may detect that it has moved from the location illustrated in FIG. 2 (with geographic area 220) to a location within border area 222, and responsively prepare to update its balloon-state and/or update its location-aware cache. Presumably, balloon 206C will have previously updated its balloon-state according to the balloon-state profile for geographic area 220, and/or will have stored data identified by the balloon-state profile for the geographic area 220 and/or user-data that is otherwise associated with geographic area 220 (e.g., by storing such data in a location-aware cache). Accordingly, when balloon 206C moves into border area 222, it may responsively prepare to update its balloon-state by determining the balloon-state profile for geographic area 230. Further, balloon 206C may begin acquiring, locating, and/or storing data that the balloon-state profile for geographic area 230 indicates should be provided while the balloon 206C is located in geographic area 230. Additionally or alternatively, when balloon 206C moves into border area 222, it may begin storing user-data associated with the adjacent geographic area 230 in its location-aware cache.

In a further aspect, a balloon may keep previously-stored data in its location-aware cache while it is located in a border area. Such previously-stored data may include, but is not limited to: (a) user-data that is associated with the geographic area in which it is currently and/or was previously located in, and/or (b) data that is identified by the balloon-state profile for the geographic area in which it is currently and/or was previously located in. For example, in the above scenario, if balloon 206C moves into border area 222, it may keep some or all data that is associated with geographic area 220 in its location-aware cache, while at the same time acquiring, locating, and/or storing data that is associated with geographic area 230.

Further, after a balloon 206A to 206I moves into a border area 222 or 232, the balloon may wait until it moves out of the border area, and is fully within one of the adjacent coverage areas, before the balloon actually updates its balloon-state and/or deletes data that is associated with a geographic area in which the balloon was previously located. For example, while balloon 206C is located in border area 222 it may have requested and received the balloon-state profile for geographic area 230. Then, if balloon 206C does in fact move into geographic area 230, it may then proceed to update its balloon-state according to the balloon-state profile for geographic area 230. Further, if and when balloon 206C moves into geographic area 230, it may also remove (or begin deleting data that is associated with geographic area 220.

On the other hand, if balloon 206C does not end up moving into geographic area 230, and moves into or remains within geographic area 220 after moving out of border area 222, then balloon 206C may refrain from updating its balloon state. In this scenario, balloon 206C could alternatively update its balloon-state according to the balloon-state profile for geographic area 220 (e.g., if the balloon-state profile for geographic area 220 has changed since balloon 206C last updated its balloon-state). Additionally or alternatively, if balloon 206C moves into or remains within geographic area 220 after moving out of border area 222, balloon 206C may responsively remove (or begin removing) data that associated geographic area 230, which it may have stored in anticipation of possibly moving into geographic area 230.

Note that while the border areas 222 and 232 that are illustrated in FIG. 2 can be described and/or defined as areas that separate and/or at least partially define geographic areas 220 to 240, geographic areas may be defined without defining border areas. Further, border areas can alternatively be described and/or defined as areas where two or more geographic areas overlap. As yet another alternative, there may be no border areas whatsoever (either defined specifically, as areas that separate GAs, or as a result of overlapping geographic areas).

In a further aspect, the geographic areas (and border areas, if any) may be defined so as to create a substantially contiguous coverage area. For instance, in the illustrated balloon network 204, geographic areas 220 to 240 and border areas 222 to 232 subdivide a substantially contiguous coverage area. However, it should be understood that the coverage of a balloon network may also extend to locations that are not part of any defined geographic area or border area, without departing from the scope of the invention.

To determine and/or update its balloon-state, a given balloon 206A to 206I may send a profile-update request to one or more of the other balloons in balloon network 204. The profile-update request may indicate a current location of the requesting balloon (such that a receiving balloon can determine which geographic area the request is for), and/or may specifically identify the geographic area for which a cache update is being requested (e.g., by including an identification number of another unique identifier for the GA). A balloon that receives a profile-update request from another balloon, and has already learned some or all of the balloon-state profile for the identified coverage area, may respond by sending some or all of the balloon-state profile for the identified coverage area to the requesting balloon.

In some implementations, a balloon 206A to 206I may specifically send profile-update requests to another balloon or balloons that are believed to be located a geographic area for which a balloon-state profile is desired and/or that are believed to be capable of providing some or all of the desired balloon-state profile. In such an embodiment, a balloon that receives a profile-update request may assume that it is currently operating according to the desired balloon-state profile. In such an embodiment, the requesting balloon may not include an indication of its location, or an indication of the geographic area for which user-data is desired, in a profile-update request. Further, the receiving balloon may respond to the request by automatically sending a balloon-state signal that indicates and/or provides the balloon-state profile according to which it is currently operating, without further verifying whether the balloon-state profile is associated with the requesting balloon's geographic area.

In some implementations, however, a balloon 206A to 206I that receives a profile-update request may first determine whether it can indicate or provide the balloon-state profile for the desired geographic area, before responding to the profile-update request. For example, if the receiving balloon is operating according to the balloon-state profile of a geographic area that is identified in profile-update request, then the receiving balloon may respond by sending the requesting balloon its balloon-state information and/or a balloon-state signal indicating or providing some or all of the balloon-state profile according to which the receiving balloon is currently operating. On the other hand, if the receiving balloon is not operating according to the balloon-state profile for the indicated geographic area and/or is not otherwise able to indicate or provide some or all of the balloon-state profile for the indicated geographic area, then the receiving balloon may refrain from responding to the profile-update request with balloon-state information. Further, the receiving balloon may or may not send the requesting balloon a message indicating that it does not have balloon-state information for the indicated geographic area.

In some embodiments, balloons may additionally or alternatively request and/or receive some or all of a balloon-state profile from a ground-based station. For example, a control system may maintain a profile database indicating the settings for certain operational parameters to be used by balloons while operating in a given geographic area and/or other data that is associated with a given geographic area. Such a profile database may be searchable by geographic area, such that a balloon-state profile may be determined for a given geographic area. Accordingly, a control system may query the database to retrieve some or all of the balloon-state profile that is associated with a particular geographic area. Further, there may be a single, central, database that is searchable to determine particular balloon-state profiles, or a number of separate databases that collectively provide the balloon-state profiles for all geographic areas in a balloon network.

In some embodiments, the control system may be central control system, which provides the balloon-state profiles for all geographic areas in a balloon network. In other embodiments, there may be a number of regional control systems, which may operate independently or may communicate with a central control system that coordinates and/or controls certain functions of the regional systems, such as is illustrated in FIG. 2.

More specifically, in the configuration illustrated in FIG. 2, regional control systems 202A to 202C may provide at least a portion of the respective balloon-state profile for each of geographic areas 220 to 240. Accordingly, a balloon may update its balloon-state profile according to the balloon-state profile for a given geographic area 220 to 240 by communicating with the regional control system 202A to 202C that is associated with the given geographic area.

Further, to update its state according to its current geographic area, a balloon may communicate directly with a regional control system 202A to 202C, or may communicate indirectly with a regional control system via other balloons and/or other ground-based stations. For example, in the illustrated state of balloon network 204, if balloon 206A determines that it should update its state with the balloon-state profile for geographic area 220, then balloon 206A may send a profile-update request to regional control system 202A. However, if balloon 206C determines that it should update its state with the balloon-state profile for geographic area 220, then balloon 206C may send a profile-update request to regional control system 202A indirectly; e.g., via balloon 206A or via balloon 206B and 206A.

In some embodiments, a control system or systems may detect when a balloon 206A to 206I should update its state, and responsively notify the balloon. Therefore, in such an embodiment, the balloon may not need to send a profile-update request in order to update its state. For example, a control system, such as one of regional control systems 202A to 202C, may determine that a balloon is at a location that is associated with a first geographic area of the balloon network, and that the balloon is operating according to a balloon-state profile for a different geographic area and/or that the balloon-state profile for the first geographic area has been updated since it was last provided to the balloon. In response, the control system may send the balloon a message indicating that the balloon should update its state according to the current balloon-state profile for the first geographic area.

Note that to facilitate a control system detecting when a balloon should update is state according to a different balloon-state profile, a given balloon 206A to 206I may periodically send location update messages to one or more ground-based control systems, which indicate the balloon's location. As such, when a control system determines that a balloon has moved to a location associated with a new geographic area, the control system may responsively send a balloon-state signal to the balloon, which indicates and/or provides some or all of the balloon-state profile for the new geographic area. Further, the control system may initiate a transmission to the balloon of the user-data corresponding to the geographic area.

E. Exemplary Balloon Configuration

Figure 3:
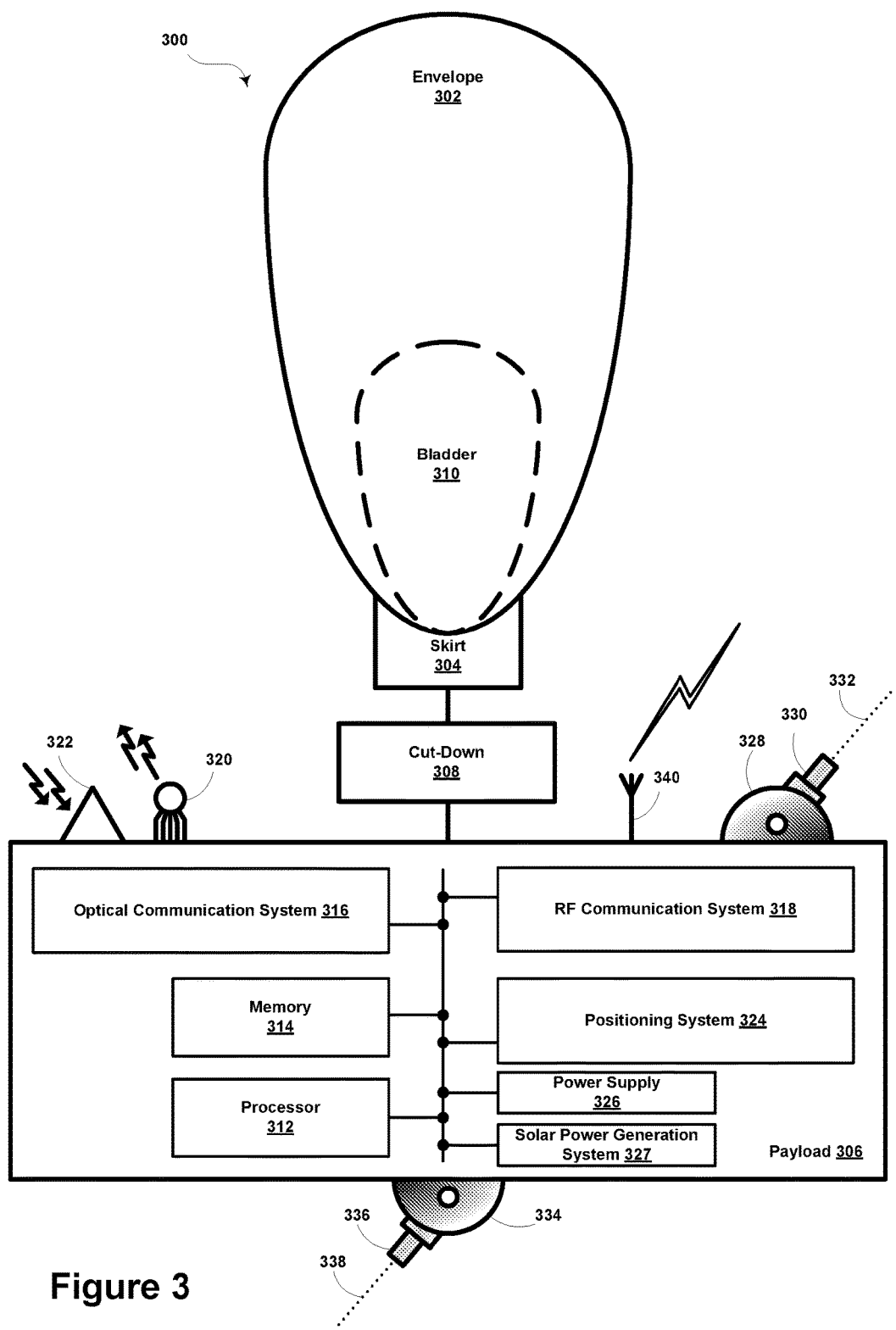
FIG. 3 shows a high-altitude balloon, according to an exemplary embodiment.

Various types of balloon systems may be incorporated in an exemplary balloon network. As noted above, an exemplary embodiment may utilize high-altitude balloons, which typically operate in an altitude range between 18 km and 22 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, which may be currently well-known or yet to be developed. For instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver (e.g., a photo-diode receiver system). Further, payload 306 may include an RF communication system 318, which may transmit and/or receive RF communications via an antenna system 324.

The payload 306 may also include a power supply 326 to supply power to the various components of balloon 300. The power supply 326 may include or take the form of a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

Further, payload 306 may include various types of other systems and sensors 328. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 306 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

III. Balloon Network with Optical and RF Links Between Balloons

Figure 4:
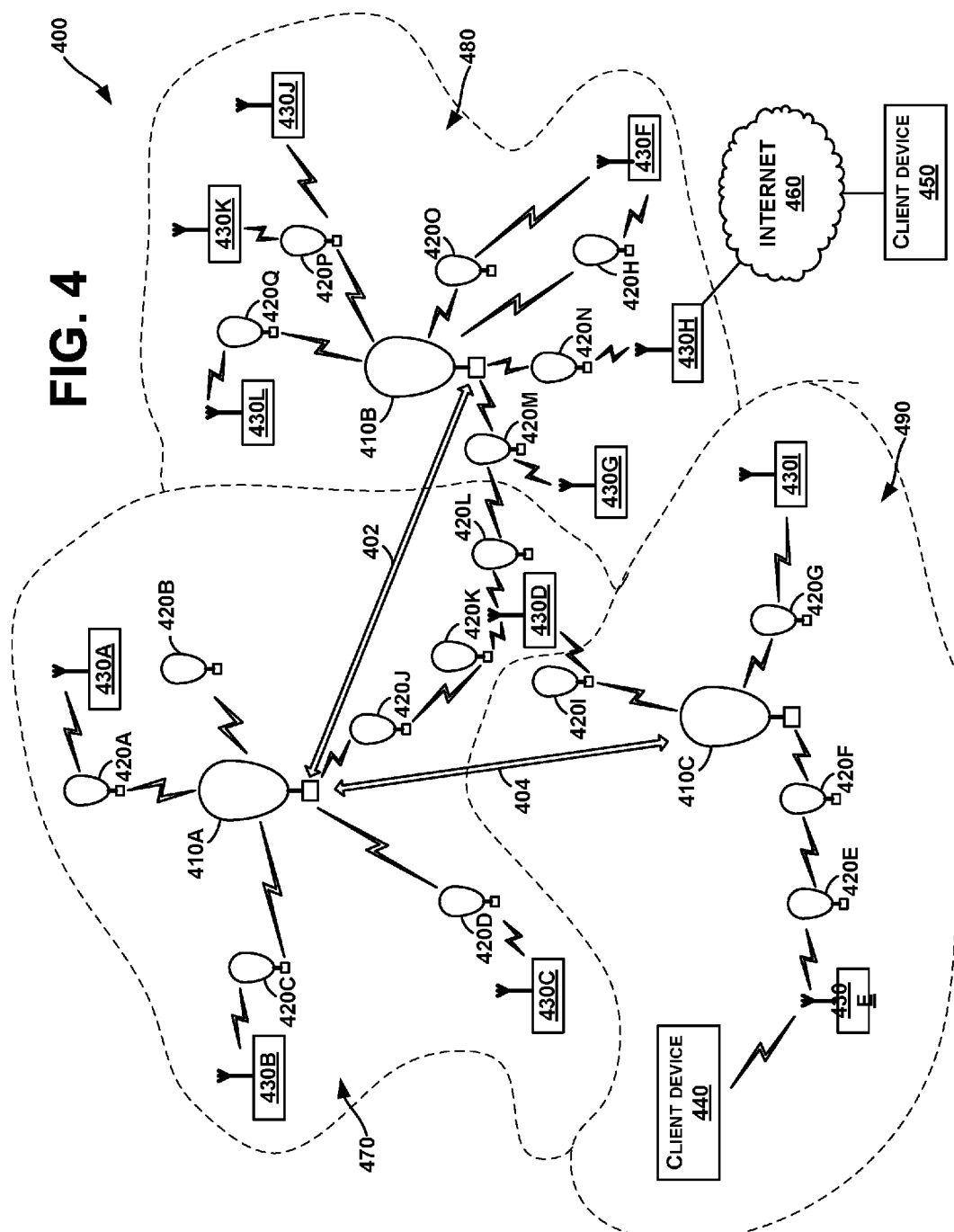
FIG. 4 is a simplified block diagram illustrating a balloon network that includes super-nodes and sub-nodes, according to an exemplary embodiment.

In some embodiments, a high-altitude-balloon network may include super-node balloons, which communicate with one another via optical links, as well as sub-node balloons, which communicate with super-node balloons via RF links. FIG. 4 is a simplified block diagram illustrating a balloon network that includes super-nodes and sub-nodes, according to an exemplary embodiment. More specifically, FIG. 4 illustrates a portion of a balloon network 400 that includes super-node balloons 410A to 410C (which may also be referred to as "super-nodes") and sub-node balloons 420A to 420Q (which may also be referred to as "sub-nodes").

Each super-node balloon 410A to 410C may include a free-space optical communication system that is operable for packet-data communication with other super-node balloons. As such, super-nodes may communicate with one another over optical links. For example, in the illustrated embodiment, super-node 410A and super-node 401B may communicate with one another over optical link 402, and super-node 410A and super-node 401C may communicate with one another over optical link 404.

Each of the sub-node balloons 420A to 420Q may include a radio-frequency (RF) communication system that is operable for packet-data communication over one or more RF air interfaces. Accordingly, some or all of the super-node balloons 410A to 410C may include an RF communication system that is operable to route packet data to one or more nearby sub-node balloons 420A to 420Q. When a sub-node 420A receives data from a super-node 410A via an RF link, the sub-node 420A may in turn use its RF communication system to transmit the received data to a ground-based station 430A to 430L via an RF link.

In some embodiments, all sub-node balloons may be configured to establish RF links with ground-based stations. For example, all sub-nodes may be configured similarly to sub-node 420A, which is operable to relay communications between super-node 410A and a ground-based station 430A via respective RF links.

In other embodiments, some or all sub-nodes may also be configured to establish RF links with other sub-nodes. For instance, in the illustrated embodiment, sub-node balloon 420F is operable to relay communications between super-node 410C and sub-node balloon 420E. In such an embodiment, two or more sub-nodes may provide a multi-hop path between a super-node balloon and a ground-based station, such as the multi-hop path provided between super-node 410C and a ground-based station 430E by sub-node balloons 420E and 420F.

Note that an RF link may be a directional link between a given entity and one or more other entities, or may be part of an omni-directional broadcast. In the case of an RF broadcast, it is possible that one or more "links" may be provided via a single broadcast. For example, super-node balloon 410A may establish a separate RF link with each of sub-node balloons 420A, 420B, and 420C. However, in other implementations, super-node balloon 410A may broadcast a single RF signal that can be received by sub-node balloons 420A, 420B, and 420C. In such an implementation, the single RF broadcast may effectively provide all of the RF links between super-node balloon 410A and sub-node balloons 420A, 420B, and 420C. Other examples are also possible.

Generally, the free-space optical links between super-node balloons have more bandwidth capacity than the RF links between super-node balloons and sub-node balloons. Further, free-space optical communication may be received at a much greater distance than RF communications. As such, the super-node balloons 410A to 410C may function as the backbone of the balloon network 400, while the sub-nodes 420A to 420Q may provide sub-networks providing access to the balloon network and/or connecting the balloon network to other networks.

As noted above, the super-nodes 410A to 410C may be configured for both longer-range optical communication with other super-nodes and shorter-range RF communications with nearby sub-nodes 420. For example, super-nodes 410A to 410C may use high-power or ultra-bright LEDs to transmit optical signals over optical links 402, 404, which may extend for as much as 100 miles, or possibly more. Configured as such, the super-nodes 410A to 410C may be capable of optical communications at data rates of 10 to 50 Gbit/sec.

A larger number of high-altitude balloons may then be configured as sub-nodes, which may communicate with ground-based Internet nodes at data rates on the order of approximately 10 Mbit/sec. For instance, in the illustrated implementation, the sub-nodes 420A to 420Q may be configured to connect the super-nodes 410A to 410C to other networks and/or directly to client devices. Note that the data rates and link distances described in the above example and elsewhere herein are provided for illustrative purposes and should not be considered limiting; other data rates and link distances are possible.

In a further aspect, some or all of the super-node balloons may be configured as downlink balloons. Additionally or alternatively, some or all of sub-nodes 420A to 420Q may be configured as downlink balloons. Further, it is possible that a hierarchical balloon network such as that shown in FIG. 4 may be implemented without any downlink balloons.

Further, in some embodiments, the super-node balloons, such as super-nodes 410A to 410C, may function as a core network (i.e., a backbone network), while the sub-node balloons 420A to 420Q may function as one or more access networks to the core network of super-nodes. In such an embodiment, some or all of the sub-nodes 420A to 420Q may also function as gateways to the balloon network 400. Note also that in some embodiments, some or all of the ground-based stations 430A to 430L may additionally or alternatively function as gateways to balloon network 400.

In another aspect, it should be understood that the network topology of the hierarchical balloon network shown in FIG. 4 is but one of many possible network topologies. Further, the network topology of an exemplary balloon network may vary dynamically as super-node and/or sub-node balloons move relative to the ground and/or relative to one another. Further, as with the balloon networks illustrated in FIGS. 1 and 2, a desired topology may be specified for a hierarchical balloon network may change dynamically over time as service needs and/or goals of the network change.

Location-specific balloon-state profiles may also be implemented in a heterogeneous balloon network, such as balloon network 400. For example, as shown in FIG. 4, geographic areas 470, 480, and 490 may be defined within the coverage area of balloon network 400.

In an embodiment where super-node balloons 410A to 410C serve as a core network, and sub-node balloons 420A to 420Q provide an access network or access networks, location-specific balloon-state profiles may only be implemented by the sub-node balloons 420A to 420Q. Alternatively, both super-node balloons 410A to 410C and sub-node balloons 420A to 420Q can implement location-specific balloon-state profiles.

Further, in some embodiments, a super-node balloon 410A to 410C may facilitate implementation of location-specific balloon-state profiles by some or all of sub-node balloons 420A to 420Q. For example, each super-node balloon 410A to 410C could store a balloon-state profile for a certain geographic area 470 to 490, respectively. As such, a sub-node balloon 420A to 420Q could query a nearby super-node balloon for the balloon-state profile that is associated with the geographic area in which it located or anticipates that it will soon be located. Alternatively, a super-node balloon 410A to 410C may function as a control system, in a similar manner as described above in reference to FIG. 2. Other implementations of location-specific balloon-state profiles in heterogeneous balloon networks are also possible.

V. Examples of Methods

Figure 5A:
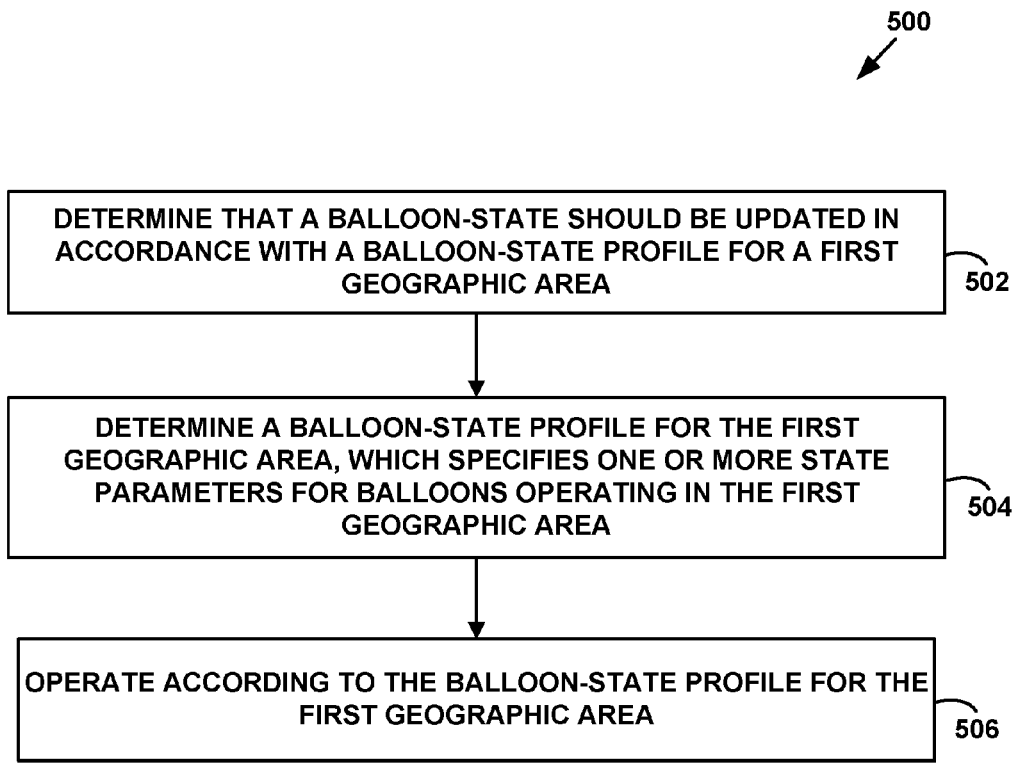
FIG. 5A is a simplified flow chart illustrating a method, according to an exemplary embodiment.

A. Example Balloon-Implemented Methods for a Updating Balloon State According to Location-Specific Balloon-State Profiles FIG. 5A is a simplified flow chart illustrating a method 500, according to an exemplary embodiment. Method 500 may be implemented by a balloon in a balloon network to maintain and/or update its state as it moves to different geographic areas in a balloon network, according to the location-specific balloon-state profiles for the different GAs, and possibly for other purposes as well or instead.

More specifically, method 500 involves a balloon, which is at a location associated with the first geographic area in a balloon network, determining that its state (also referred to herein as the "balloon-state" of the balloon) should be updated in accordance with a balloon-state profile for the first geographic area, as shown by block 502. Responsive to determining that its balloon-state should be updated, the balloon may determine the balloon-state profile for the first geographic area, which may specify one or more state parameters for balloons operating in the first geographic area, as shown by block 504. The balloon may then operate according to the balloon-state profile for the first geographic area, as shown by block 506.

In an exemplary method 700, the state parameters specified by a balloon-state profile may include various operational parameters for a balloon. For instance, a service protocol for a given geographic area may specify: (a) a communication protocol or protocols to be used for communications with ground-based stations and/or other balloons in the area, (b) parameters for routing between balloons and ground-based stations in area, (c) transmission power requirements (e.g., minimum and/or maximum transmission power), (d) error correction coding, (e) a desired topology for the portion of the balloon network serving the area, (f) identifying information and/or other information relating to ground-based stations or other fixed systems in the area, which the balloon can connect to (e.g., to connect with other networks), (g) power management of balloon while in the area, (h) parameters affecting the horizontal and/or altitudinal movement of the balloon (e.g., limits on speed, a maximum altitude, and/or a minimum altitude, etc.), and/or (i) parameters required in order to fall within a desired regulatory class set out by the government of the country in which the area is located, or to otherwise comply with legal requirements or regulations in the geographic area, among others.

In some embodiments, the balloon-state profile for a given geographic area may include state parameters that provide or identify data that should be acquired, stored, and/or provided by the balloon while operating in the geographic area. Such data may include, for example, commonly-accessed web pages in certain language, program instructions for language-specific functionality that is required or used to operate according to the operational parameters, and/or other types of data that may be useful in some locations, but not in others.

In some embodiments, the balloon-state profile for a given geographic area may include state parameters that indicate certain modes of operation for a geographic area. The state parameters that define a mode of operation for a given geographic area may be highly adaptable to help optimize service for a given geographic area.

For example, consider the scenario where a geographic area with high bandwidth utilization (e.g., a high-usage area) is adjacent to geographic area with significantly lower bandwidth utilization (e.g., a low-usage area). Further, in the geographic areas, the balloon network may provide service to some high-priority subscribers (e.g., subscribers who have paid for premium service) and some low-priority subscribers (e.g., subscribers who have not paid for the premium service). A state parameter may specify whether a first or second mode of operation should be utilized in a given geographic area, where implementing the first mode of operation specifies a lower threshold bandwidth utilization for restricting the amount of bandwidth allocated to a low-priority subscriber than is specified by the second mode of operation. Thus, the balloon-state profile for the high-usage area may indicate the first mode of operation, while the balloon-state profile for the low-usage area may indicate the second mode of operation. Thus, a balloon that leaves a high-usage area and enters an adjacent low-usage area may increase the threshold bandwidth utilization at which it restricts the amount of bandwidth that can be allocated to a low-priority subscriber. As a result, a balloon may accept a greater number of bandwidth requests from low-priority subscribers in the low-usage area, than it did while operating according to the balloon-state profile for the high-usage area. Other examples are also possible.

i. Determining that Balloon-State Information should be Updated

At block 502 of an exemplary method 500, a balloon may use various techniques to determine that it should update its state in accordance with the balloon-state profile for a certain geographic area.

For example, a balloon may detect when it moves from a location that is not associated with a first geographic area (e.g., that is outside the first geographic area), to a location within the first geographic area. When movement into the first geographic area is detected, the balloon will likely be operating in accordance with the balloon-state profile for the geographic area in which it was previously located. Accordingly, when the balloon detects that it has moved into a new geographic area, the balloon may respond by proceeding to send a profile-update request at block 504.

In some implementations, block 502 may involve the balloon detecting a movement of the balloon into a border area of the first geographic area, from a location that is not associated with the first geographic area (e.g., from a location that is outside the border area and in another geographic area), such as is described above in reference to FIG. 2. When the balloon moves into a border area of a geographic area, this may be interpreted to mean that the balloon is moving towards the geographic area. Accordingly, a balloon may respond to movement into a border area by sending a profile-update request at block 504.

Note that when a balloon moves into a border area, a balloon may also check its previous, current, and/or planned direction of movement to verify that it is heading towards a different geographic area (e.g., from another geographic area into the first GA). Further, based on the previous, current, and/or planned direction of movement, the balloon may determine the probability that it will move into the different geographic area. As such, when the balloon is located in a border area, the balloon may condition the transmission of a profile-update request, at block 504, upon a determination that the probability of moving into the first geographic area is greater than a threshold probability.

In a further aspect, to determine when to update its state, a balloon may run a background process to monitor its location and detect when it moves into a new geographic area and/or when it moves into a border area, and should therefore update, or prepare to update, its state according to the balloon-state profile of a different geographic area.

ii. Determining the Balloon-State Profile for a Geographic Area

At block 504 of method 500, a balloon may use various techniques to determine the balloon-state profile for a given geographic area.

In some embodiments, the balloon may acquire some or all of the information making up a balloon-state profile from nearby balloons that are operating in the balloon network. In such an embodiment, block 504 may involve the balloon sending a profile-update request to one or more other balloons. The balloon may then receive at least a portion of the requested balloon-state profile for the first geographic area from one or more balloons that received the profile-update request.

In some embodiments, the balloon may additionally or alternatively send a profile-update request to at least one ground-based station that is associated with the geographic area for which the balloon-state profile is being requested. As such, a balloon may acquire some or all of the information making up a balloon-state profile from the ground-based station or stations that are located in or otherwise associated with the geographic area.

In some cases, the balloon may receive the entire balloon-state profile for a geographic area from a single nearby balloon, which responds to the profile-update request. In other cases, a balloon may receive different portions of the balloon-state profile from a number of different balloons. In yet other cases, a balloon may receive a portion or portions of the balloon-state profile from one or more nearby balloons, and receive another portion or portions from one or more ground-based stations.

In some embodiments, some or all balloons that operate in a balloon network may be configured to broadcast a balloon-state signal via a designated communications channel, which indicates at least a portion of the balloon-state profile for a geographic area with which the broadcasting balloon is associated (e.g., the geographic area in which the balloon is currently located or a geographic area that the balloon was recently located in). In such an embodiment, block 504 may involve the balloon that seeks to determine the balloon-state profile for the first geographic area, searching the designated communication channel for a balloon-state signal that indicates at least a portion of the balloon-state profile for the first geographic area.

Figure 5B:
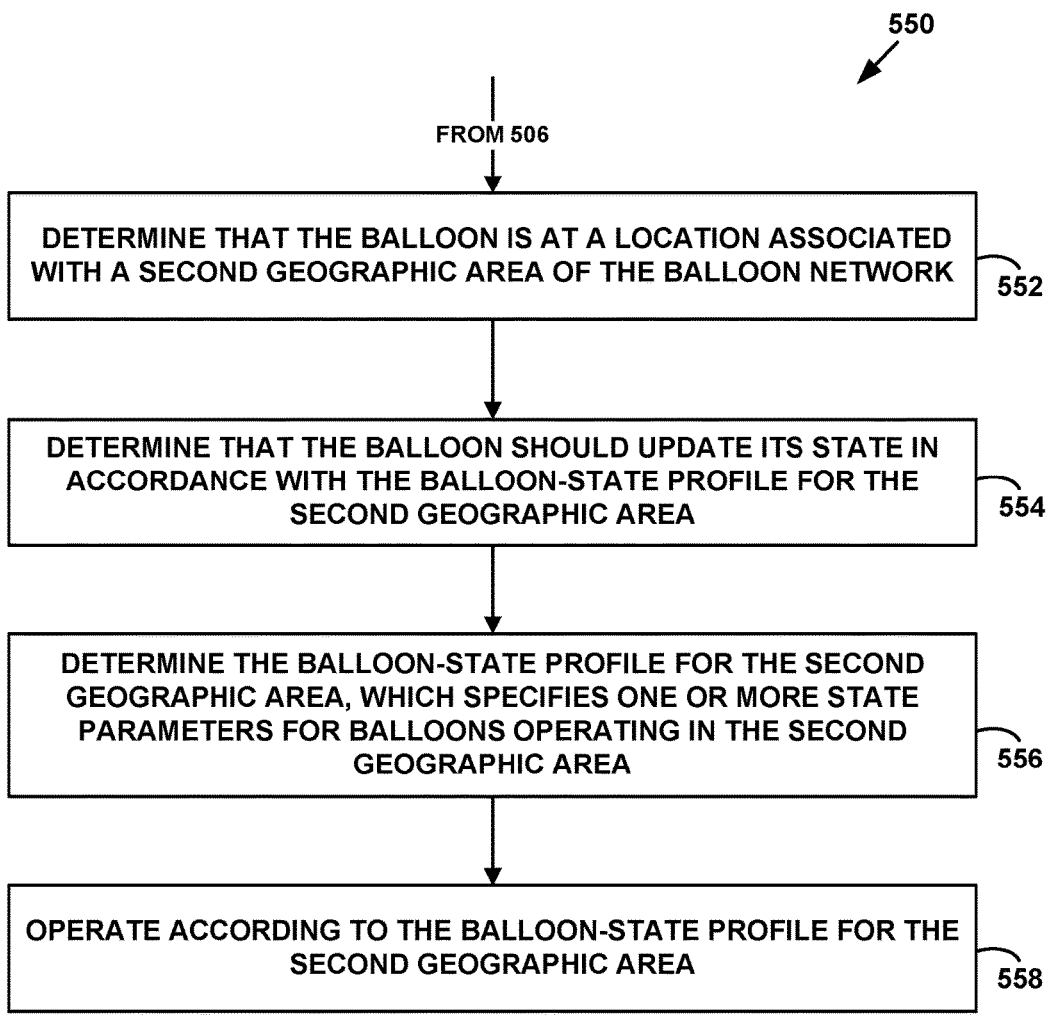
FIG. 5B is a flow chart illustrating a method, which is a continuation of the method shown in FIG. 5A, according to an exemplary embodiment.

FIG. 5B is a flow chart illustrating a method 550, which is a continuation of the method 500 shown in FIG. 5A, according to an exemplary embodiment. Method 550 may be implemented, for example, after the balloon has updated its state according to the balloon-state profile for the first geographic area, when the balloon moves from the first geographic area to a second geographic area.

More specifically, method 550 involves the balloon determining that the balloon is at a location associated with a second geographic area of the balloon network (e.g., a location within the second geographic area or within a border area of the second GA), as shown by block 552. The balloon may then determine that it should update its state in accordance with the balloon-state profile for the second geographic area, as shown by block 554. Then, in response to determining that it should update its state, the balloon may determine the balloon-state profile for the second geographic area, which includes one or more state parameters for balloons operating in the second geographic area, as shown by block 556. The balloon may then operate according to the balloon-state profile for the second geographic area, as shown by block 558.

Further, a given balloon in a balloon network may repeat method 500 or portions thereof (e.g., such as by carrying out method 550) whenever it detects it has moved or is about to move into a different geographic area. By doing so, a given balloon may adjust its state according to the balloon-state profile in whatever geographic area the balloon is located in and/or expects to be located in.

In a further aspect, a number of balloons may implement method 500 and/or method 550, as the balloons move between geographic areas in a balloon network, the fact that balloons are moving into and out of a geographic area may be substantially transparent to an end user in the geographic area. In particular, when a first balloon moves out of a geographic area, end users that are communicating via the first balloon may be handed off to a second balloon that is operating in the geographic area. The second balloon can also implement method 500 and/or method 550, and thus, the second balloon may still be operating according to the balloon-state profile for the geographic area. Further, as other balloons move into the geographic area, the other balloons may implement method 500 and/or method 550, and thus may update their respective states so as to operate according to balloon-state profile for the geographic area. This functionality of the balloons may collectively help to provide continuity in service and network operation in the geographic area, even though the balloon or balloons that operate in the geographic area change over time.

In a further aspect, there may be scenarios where it undesirable for a balloon to move out of a geographic area, unless at least one other balloon takes its place in the geographic area. Accordingly, a balloon may be further operable to determine whether a replacement balloon is needed and/or taking steps to find a replacement plan. For example, a balloon may determine As a specific example, consider an embodiment where block 502 involves the balloon determining that it is in a border area, and likely to move into a different geographic area. In such an embodiment, the balloon may responsively determine how many other balloons are located in the geographic area (and presumably configured according to the balloon-state profile for the GA). To do so, the balloon may broadcast a message requesting that nearby balloons indicate whether they are located in and/or operating according to the balloon-state profile for, the geographic area that the balloon is about to or expects to move out of. A balloon could also send a message to a ground-based station requesting information indicative of which and/or how many other balloons are currently in a geographic area and/or operating according to the balloon-state profile for the geographic area. Additionally or alternatively, the identity and/or balloon-state of nearby balloons may already be stored at the balloon. For instance, balloons may be configured to maintain and update a database of nearby balloons by e.g., communicating location and/or balloon-state information to one another and/or receiving such information from ground-based stations.

Once a balloon identifies other balloons in the geographic area that it is about to move out of, the balloon may determine whether another balloon should take its place in the geographic area. For example, a density requirement may be defined for a geographic area, which may indicate, for example, a minimum and/or maximum number of balloons that should provide service in the geographic area at a given point in time. As such, the balloon may compare the current number of other balloons operating in the geographic area to a minimum number for the geographic area and, if the current number is less than the minimum number, may take actions to find a replacement. For example, the balloon may send a message to nearby balloons and/or a ground-based station that is associated with the geographic area, which indicates: (a) that the balloon has moved, or is about to or expects to move, out of the geographic area, and/or (b) that another balloon should move into the geographic area and update its state according to the balloon-state profile for the geographic area. Other examples are also possible.

B. Method for Providing a Balloon-State Profile to Other Balloons

Figure 6:
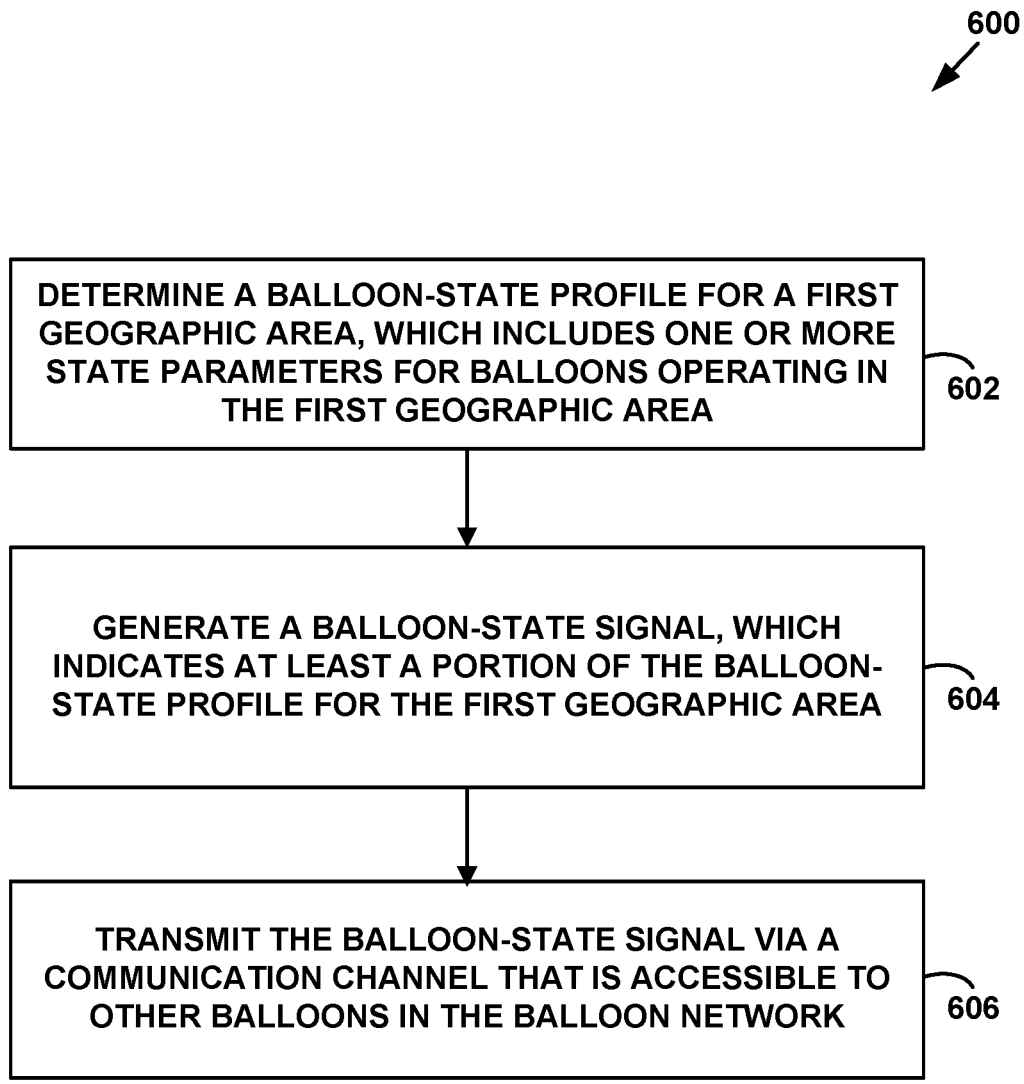
FIG. 6 is a simplified flow chart illustrating a method, according to an exemplary embodiment.

FIG. 6 is a simplified flow chart illustrating a method 600, according to an exemplary embodiment. Method 600 may be implemented by a balloon in a balloon network to, e.g., hand off some or all of a balloon-state profile for a geographic area, to another balloon that has entered or is about to enter the geographic area.

More specifically, method 600 involves a balloon determining a balloon-state profile for a first geographic area, which includes one or more state parameters for balloons operating in the first geographic area, as shown by block 602. In an example embodiment, the first geographic area may be the geographic area in which the balloon is currently located. The balloon may then generate a balloon-state signal, which indicates at least a portion of the balloon-state profile for the first geographic area, as shown by block 604. The balloon can then transmit the balloon-state signal via a communication channel that is accessible to other balloons in the balloon network, as shown by block 606.

In some embodiments of method 600, the balloon may broadcast the balloon-state signal via a communication channel, such that the balloon-state signal is available to any balloon that is monitoring the communication channel. For example, a network-coordination channel may be defined over an RF air-interface. As such, the balloon-state signal may be an RF signal, which the balloon broadcasts on the network-coordination channel. In such an example, other balloons may acquire the balloon-state signal by monitoring and/or searching the network-coordination channel for balloon-state signals. Other types of balloon-state signals are also possible.

In other embodiments, the balloon may send the balloon-state signal specifically to a second balloon or to multiple other balloons. In such an embodiment, a first balloon may initially determine that a second balloon should be updated with the balloon-state profile for the first geographic area. This may simply involve the first balloon receiving a profile-update request from the second balloon. Alternatively, the first balloon may send a message requesting that the second balloon indicate the balloon-state profile that the second balloon is currently implementing, and determine that the second balloon's balloon-state profile is not current (e.g., is associated with a different geographic area than the second balloon is currently operating in). In either case, when the first balloon determines that the state of the second balloon should be updated, then the first balloon may responsively send a balloon-state signal (which may also be referred to as a "balloon-state message") to the second balloon. In such an embodiment, the communication channel that is utilized to send the balloon-state signal to the second balloon may be defined on an RF air interface, on a free-space optical link, or on another wireless link or wireless air-interface between the two balloons.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A computer-implemented method comprising:
    while an aerial vehicle is at a location associated with a second geographic area, operating the aerial vehicle according to a second vehicle-state profile, wherein the second vehicle-state profile specifies one or more operational parameters for use by aerial vehicles from an aerial network while located in the second geographic area;
    subsequently determining, by the aerial vehicle, that the aerial vehicle has moved to a location associated with a first geographic area; and
    in response to determining that the aerial vehicle has moved to a location associated with the first geographic area:
        determining a first vehicle-state profile for the first geographic area, wherein the first vehicle-state profile specifies one or more operational parameters for use by aerial vehicles from the aerial network while located in the first geographic area; and
        causing the aerial vehicle to switch from operation according to the second vehicle-state profile to operate according to the first vehicle-state profile.

2. The method of claim 1, wherein determining that the aerial vehicle has moved to a location associated with the first geographic area comprises:
    determining that the aerial vehicle has moved to a location within the first geographic area.

3. The method of claim 1, wherein determining that the aerial vehicle has moved to a location associated with the first geographic area comprises:
    determining that the aerial vehicle has moved into a border area that is adjacent to the first geographic area.

4. The method of claim 3, wherein the border area is between the first geographic area and the second geographic area.

5. The method of claim 3, wherein the border area is an edge portion of the second geographic area that is adjacent to the first geographic area.

6. The method of claim 5, wherein sending the profile-update request comprises sending the profile-update request to one or more other aerial vehicles in the aerial network, and wherein at least a portion of the first vehicle-state profile is received from one or more of the other aerial vehicles.

7. The method of claim 5, wherein sending the profile-update request comprises:
    sending the profile-update request to a ground-based station that is associated with the first geographic area, wherein at least a portion of the first vehicle-state profile is received from the ground-based station.

8. The method of claim 3, further comprising:
    determining a direction in which the aerial vehicle is travelling; and
    determining whether or not the direction in which the aerial vehicle is travelling is towards the first geographic area;
    wherein the responsive determination of the first vehicle-state profile and switch from operation according to the second vehicle-state profile to operation according to the first vehicle-state profile, are conditioned upon a determination that the direction in which the aerial vehicle is travelling is towards the first geographic area.

9. The method of claim 1, wherein determining the first vehicle-state profile comprises:
    sending a profile-update request; and
    receiving, as a response to the profile-update request, at least a portion of the first vehicle-state profile.

10. The method of claim 1, wherein determining the first vehicle-state profile comprises:
    searching a communication channel for a vehicle-state signal; and
    receiving the vehicle-state signal via the communication channel, wherein the vehicle-state signal indicates at least a portion of the first vehicle-state profile.

11. The method of claim 1, wherein the one or more operational parameters indicated by the first vehicle-state profile comprise one or more of: (a) at least one parameter indicating a communication protocol or protocols to be used in the first geographic area, (b) at least one parameter providing routing information for the first geographic area, (c) at least one parameter relating to transmission power for aerial vehicles operating in the first geographic area, (d) at least one parameter indicative of error correction coding that should be implemented by an aerial vehicle in the first geographic area, (e) at least one parameter indicative of a desired topology for the aerial network in the first geographic area, (f) at least one parameter that provides information related to ground-based stations or other fixed systems in the first geographic area, (g) at least one parameter indicative of power management that should be implemented by an aerial vehicle in the first geographic area, (h) at least one parameter affecting the horizontal and/or altitudinal movement of the aerial vehicle, and/or (i) at least one parameter providing information for complying with a legal requirement for the first geographic area.

12. The method of claim 1, further comprising:
subsequently, after causing the aerial vehicle to operate according to the first vehicle-state profile, determining that the aerial vehicle at a location associated with the second geographic area of the aerial network;
in response to the subsequent determination that the aerial vehicle is at a location associated with the second geographic area, causing the aerial vehicle to again operate according to the second vehicle-state profile.

13. A computer-implemented method comprising:
while an aerial vehicle is operating in an aerial network and is at a location associated with a second geographic area, transmitting a second vehicle-state signal that is accessible to one or more other aerial vehicles in the aerial network, wherein the second vehicle-state signal provides at least a portion of a second vehicle-state profile for the second geographic area, and wherein the second vehicle state profile comprises one or more operational parameters for use by aerial vehicles from an aerial network while located in the second geographic area; and
subsequently determining that the aerial vehicle is at a location associated with a first geographic area in the aerial network, and responsively:
transmitting a first vehicle-state signal that is accessible to one or more other aerial vehicles in the aerial network, wherein the first vehicle-state signal provides at least a portion of a first vehicle-state profile for the first geographic area, and wherein the first vehicle-state profile comprises one or more operational parameters for use by aerial vehicles from the aerial network while located in the first geographic area.

14. The method of claim 13:
wherein transmitting the first vehicle-state signal comprises broadcasting the first vehicle-state signal over a first communication channel, such that the first vehicle-state signal is available to any aerial vehicle in the aerial network that is monitoring the first communication channel; and
wherein transmitting the second vehicle-state signal comprises broadcasting the second vehicle-state signal over a second communication channel, such that the second vehicle-state signal is available to any aerial vehicle in the aerial network that is monitoring the second communication channel.

15. The method of claim 14, wherein the first communication channel is defined on a first RF air-interface, and wherein the second communication channel is defined on a second RF air-interface.

16. The method of claim 14, wherein the aerial vehicle is a first aerial vehicle, and wherein the first communication channel is defined on a free-space optical link between the first aerial vehicle and a second aerial vehicle.

17. The method of claim 13, wherein the aerial vehicle is a first aerial vehicle, the method further comprising:
while the first aerial vehicle is at a location associated with the first geographic area, determining, at the first aerial vehicle, that a second aerial vehicle should be updated with the vehicle-state profile for the first geographic area; and
responsively sending the first vehicle-state signal from the first aerial vehicle to the second aerial vehicle.

18. A non-transitory computer-readable medium having program instructions stored thereon that are executable by at least one processor, the program instructions comprising:
instructions for, while an aerial vehicle is operating in an aerial network and is at a location associated with a second geographic area, transmitting a second vehicle-state signal that is accessible to one or more other aerial vehicles in the aerial network, wherein the second vehicle-state signal provides at least a portion of a second vehicle-state profile for the second geographic area, and wherein the second vehicle state profile comprises one or more operational parameters for use by aerial vehicles from an aerial network while located in the second geographic area; and
instructions for subsequently determining that the aerial vehicle is at a location associated with a first geographic area in the aerial network, and responsively:
transmitting a first vehicle-state signal that is accessible to one or more other aerial vehicles in the aerial network, wherein the first vehicle-state signal provides at least a portion of a first vehicle-state profile for the first geographic area, and wherein the first vehicle-state profile comprises one or more operational parameters for use by aerial vehicles from the aerial network while located in the first geographic area.

19. The non-transitory computer-readable medium of claim 18, wherein the instructions for transmitting the first vehicle-state signal comprise instructions for broadcasting the first vehicle-state signal such that the vehicle-state signal is available to any aerial vehicle that is monitoring a first communication channel.

20. The non-transitory computer-readable medium of claim 18, wherein the aerial vehicle is a first aerial vehicle, the method further comprising:
instructions for determining, at the first aerial vehicle, that a second aerial vehicle should be updated with the first vehicle-state profile for the first geographic area, and responsively sending the first vehicle-state signal to the second aerial vehicle.

* * * * *